United States Patent
Borgen et al.

(10) Patent No.: US 7,269,222 B2
(45) Date of Patent: Sep. 11, 2007

(54) MINIATURIZED PULSE CODE MODULATION ENCODER

(75) Inventors: Gary Steward Borgen, Camarillo, CA (US); David Escobar Marron, Oxnard, CA (US); Christian Lauritz Houlberg, Ventura, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 650 days.

(21) Appl. No.: 10/914,778

(22) Filed: Aug. 5, 2004

(65) Prior Publication Data

US 2006/0039484 A1    Feb. 23, 2006

(51) Int. Cl.
*H04B 14/04*    (2006.01)

(52) U.S. Cl. ...................................... 375/242

(58) Field of Classification Search ................. 375/242
See application file for complete search history.

(56) References Cited

U.S. PATENT DOCUMENTS 6,564,146 B1 * 5/2003 Meyer et al. ............... 701/213

* cited by examiner

*Primary Examiner*—David C. Payne
*Assistant Examiner*—Aslan Ettehadieh
(74) *Attorney, Agent, or Firm*—David S. Kalmbaugh

(57) ABSTRACT

A PCM encoder which receives asynchronous serial data and incorporating the serial data and eight channels of analog data into a PCM data stream. The encoder includes a microprocessor which processes the serial data provided in eight bit digital words and the analog data which the microprocessor converts to twelve bit digital words. The encoder also has a programmable gate array which receives six bits of data during each transfer of data from the microprocessor to the gate array. The gate array for the PCM encoder also receives a Frame Sync, and then processes the data to provide a data stream containing NRZL data and Bi Phase data.

20 Claims, 13 Drawing Sheets

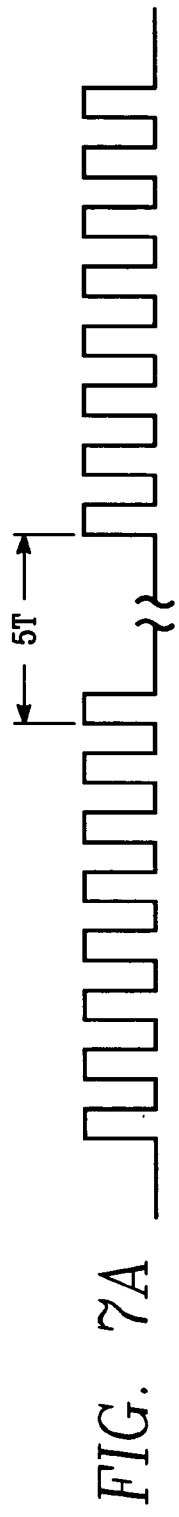
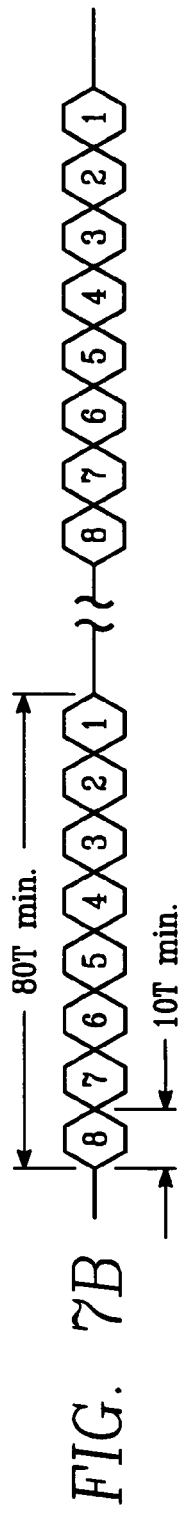
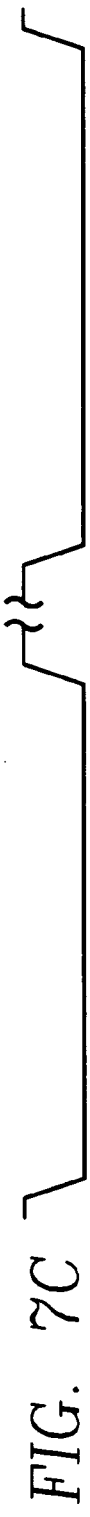
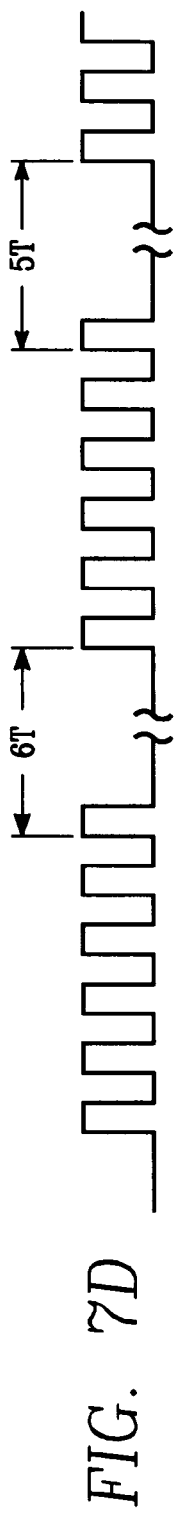
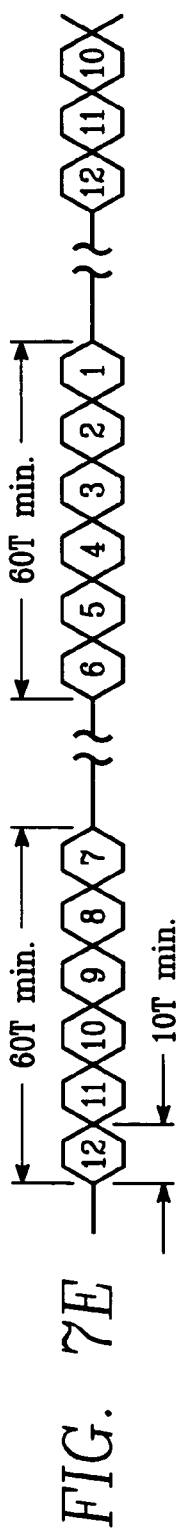
FIG. 7A
FIG. 7B
FIG. 7C
FIG. 7D
FIG. 7E
FIG. 7F

MINIATURIZED PULSE CODE MODULATION ENCODER

BACKGROUND OF THE INVENTION

1. Field of the Invention

The present invention relates generally to miniaturized encoder devices. More particularly, the present invention relates to a miniaturized encoder which receives data from multiple sensors and a GPS data source on board a small diameter projectile and then encodes the data for transmission to a receiving station.

2. Description of the Prior Art

There is currently a need to monitor and encode data from multiple sensors located on board small diameter projectiles. The sensors on board the projectile include a serial asynchronous data source which provides GPS (Global Positioning System) data and accelerometers and magnetometers which provide analog data for encoding into a PCM data stream.

The problem of limited space is especially acute when attempting to instrument projectiles such as a motor round when the instrumentation system is confined to the space inside the projectile's fuze. For example, in the standard North Atlantic Treaty Organization (NATO) fuze there is a very small space for incorporating a pulse code modulation (PCM) encoder as a component of the on board instrumentation system for the projectile.

Accordingly, there is a need for a pulse code modulation encoder which utilizes a minimal number of electronic components and which provides the capability of encoding and formatting serial asynchronous data and analog data into a PCM data stream.

SUMMARY OF THE INVENTION

The present invention overcomes some of the difficulties of the past including those mentioned above in that it comprises a highly efficient and effective microprocessor controlled multi-channel miniature PCM encoder which receives data from multiple sensors and a GPS data source on board a small diameter projectile and then encodes the data in a PCM data stream for transmission to a receiving station.

The PCM encoder receives asynchronous serial data such as data on an RS-232 bus and incorporating the RS-232 data and eight channels of analog data into a PCM data stream. The encoder includes a microprocessor which processes UART data provided in eight bit words received via the RS-232 bus and analog data received via the eight channels of analog data in twelve bit digital words after an analog to digital conversion. The encoder also has a programmable gate array which receives six digital bits during each transfer of data from the microprocessor to the gate array.

A PCM frame includes the following: the Frame Sync which is 24 bits, UART data which includes 8 data bits and 4 status bits and the eight channels of analog data with each channel of analog data having 12 bits of PCM data.

The gate array for the PCM encoder receives the Frame Sync, UART data and the data from each of the eight analog channels in six bit increments and then processes the data to provide continuous raw PCM data. The gate array outputs the raw PCM data in both a nonreturn-to-zero level (NRZL) format and a unipolar Bi Phase format.

BRIEF DESCRIPTION OF THE DRAWINGS

FIGS. 6 and 7 illustrate serial output timing diagrams for the serial peripheral interface master circuit.

DETAILED DESCRIPTION OF A PREFERRED EMBODIMENT

Figure 1:
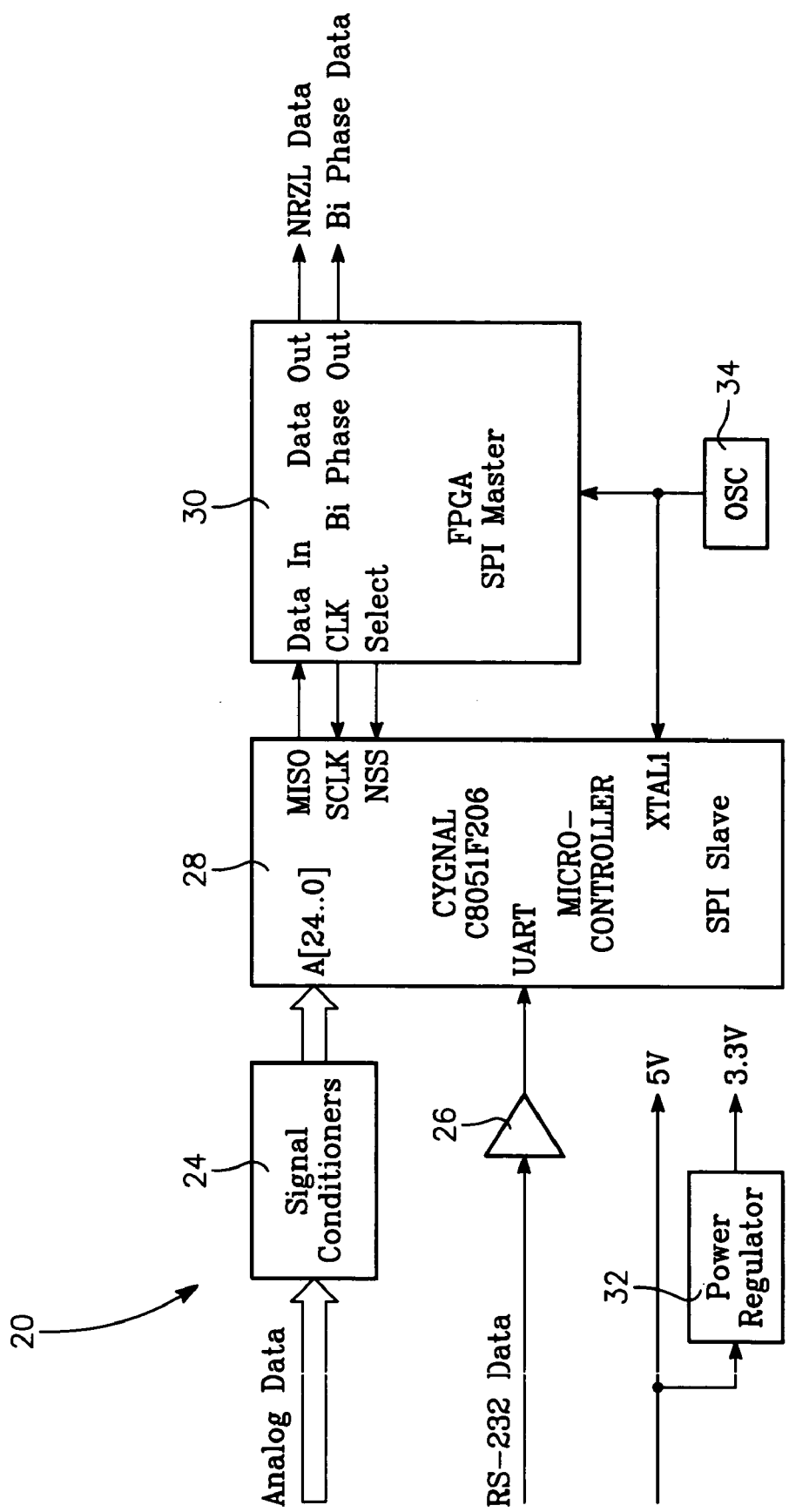
FIG. 1 is a electronics block diagram illustrating a preferred embodiment of the miniaturized pulse code modulation encoder.
Figure 5:
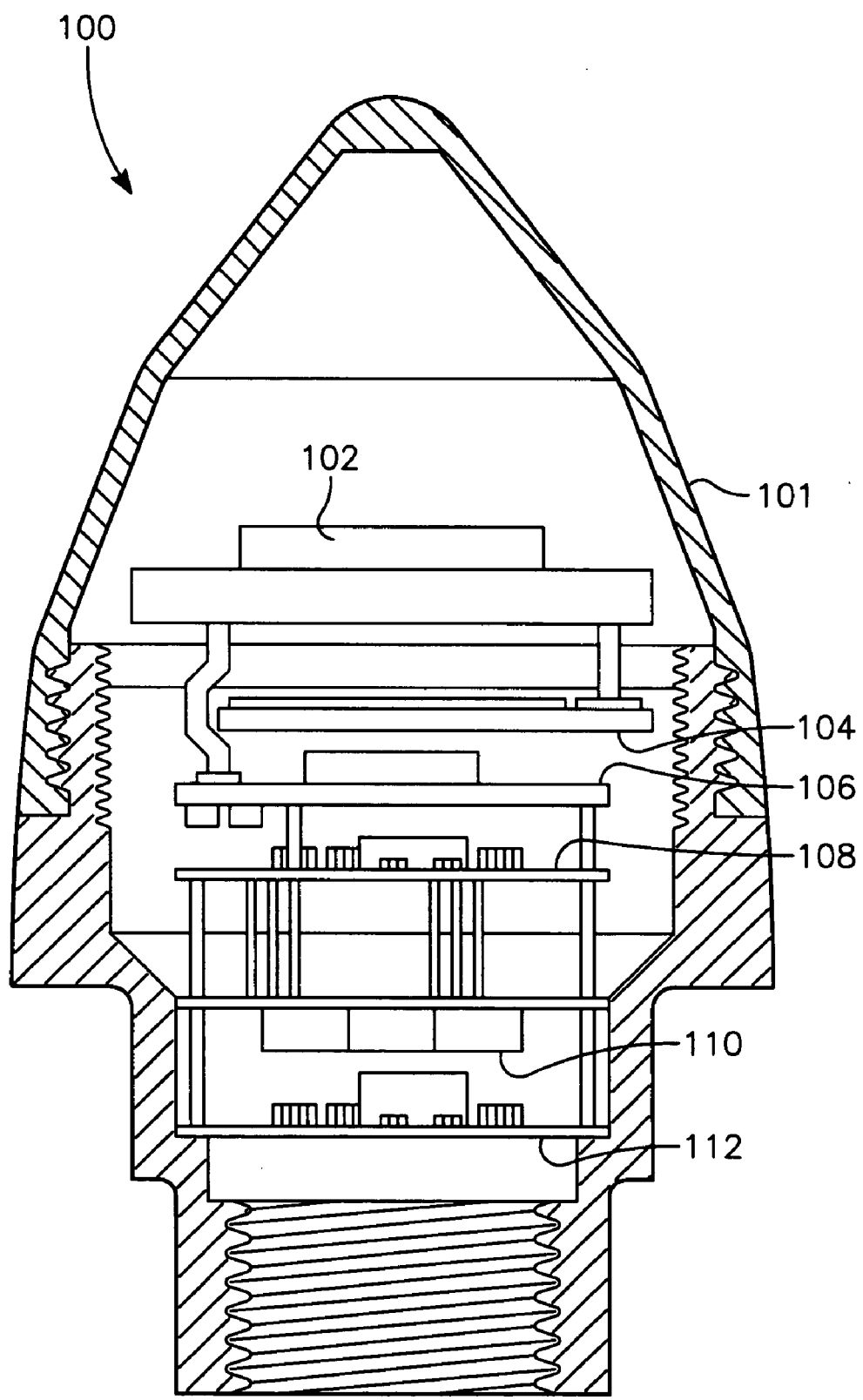
FIG. 5 is a schematic diagram of the nose cone for a projectile which has an instrumentation system including the encoder of FIG. 1 mounted therein.

Referring to FIGS. 1 and 5, FIG. 1 depicts an electronics block diagram for the miniaturized pulse code modulation (PCM) encoder 20 for use as a component of an instrumentation system which fits into a small diameter projectile. The pulse code modulation encoder 20 monitors and receives eight analog channels of sensor data and one channel of serial asychronous data. The eight analog channels of sensor data are provided by sensors which include accelerometers and magnetometers and the one channel of serial asychronous data is provided by a GPS data source.

As shown in FIG. 5, the projectiles nose cone 101 has an instrumentation package 100 mounted therein. The instrumentation package 100 includes GPS and PCM antennas 102 for receiving GPS data and transmitting PCM data, respectively, a GPS receiver 104 for processing the GPS data received by the GPS antenna and a PCM transmitter 106 for processing the PCM serial data stream sent to the PCM antenna for transmitting the PCM data stream to a receiving station. The PCM encoder and circuit board 108 are mounted in the nose cone 101 of the projectile below the PCM transmitter 106. The instrumentation system 100 also includes the sensors 110 and a power regulator 112, which are mounted in the nose cone 101 of the projectile as shown in FIG. 5.

Referring again to FIG. 1, the electronics circuit illustrated in FIG. 1 includes signal conditioners 24, a power regulator 32, a microcontroller/microprocessor 28, a miniature field programmable gate array 30 and a clock oscillator 34. The microcontroller 28 used in the preferred embodiment is a Silicon Laboratories C8051F206 field programmable mixed signal microcontroller commercially available from Silicon Laboratories of Austin, Tex. The gate array 30 used in the preferred embodiment is a Complex Programmable Logic Device (CPLD), also referred to as a Field Programmable Gate Array (FPGA), Model Number XC9572VQ, commercially available from Xilinx of San Jose, Calif.

At this time it should be noted that the embodiment depicted in FIG. 1 is adapted to support eight analog inputs for receiving analog data from on board sensors, and one serial Universal Asynchronous Receiver Transmitter (UART) input for receiving GPS data. The invention can also be configured to support up to 25 analog inputs, two discrete inputs and one serial UART input.

Figure 3:
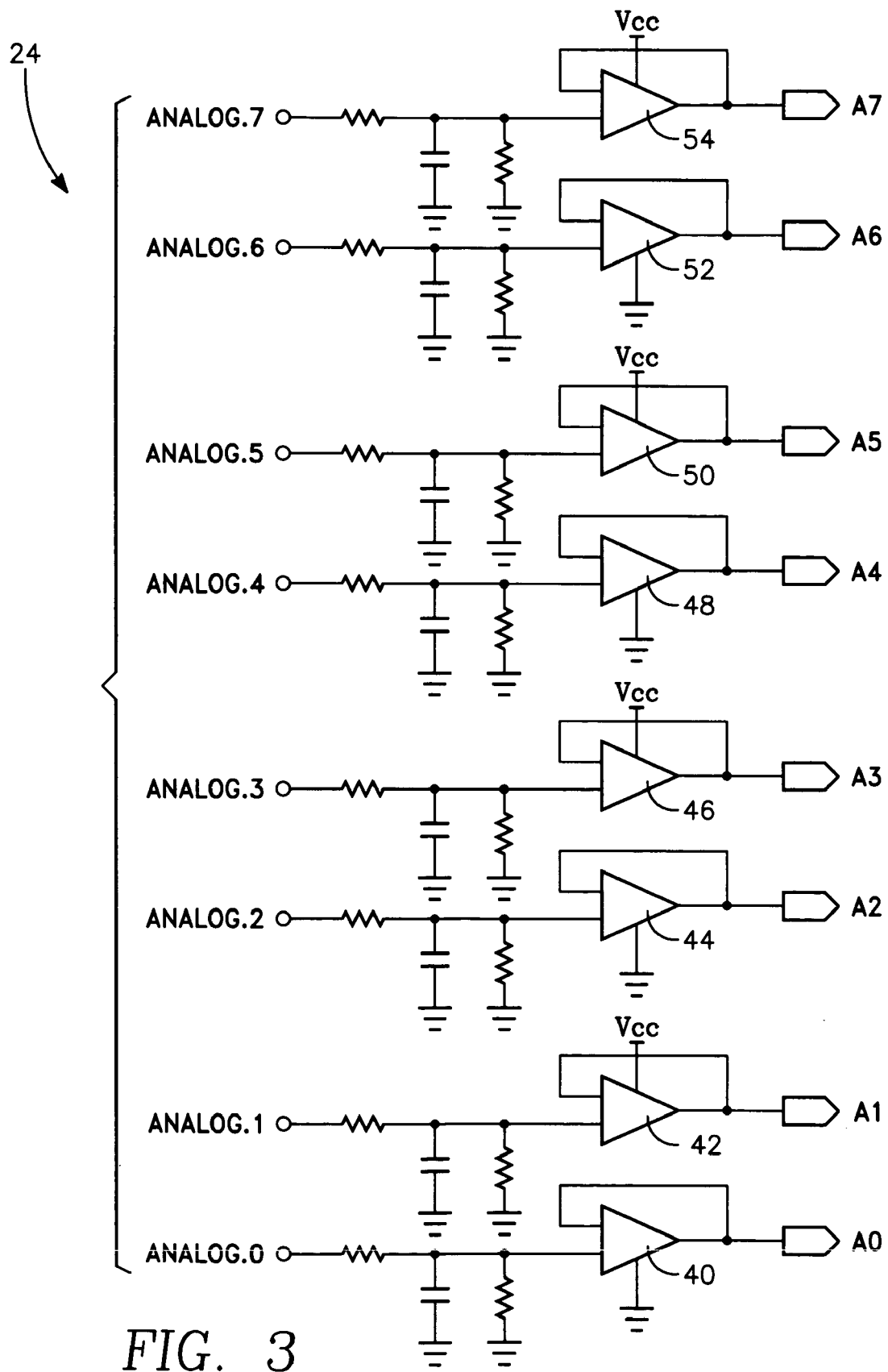
FIG. 3 illustrates the signal conditioner electronics circuitry for the miniaturized pulse code modulation encoder of FIG. 1.

Eight channels of analog data are monitored and conditioned by signal conditioner 24 which comprise operational amplifiers 40, 42, 44, 46, 48, 50, 52 and 54 (depicted in FIG. 3). Operational amplifiers 40, 42, 44, 46, 48, 50, 52 and 54 receive analog signals from on board sensors 110 and then condition the analog signals to be compatible with microcontroller 28. Operational amplifiers 40, 42, 44, 46, 48, 50, 52 and 54 are configured as voltage followers to provide for a high impedance interface into PCM encoder 20 and also eliminate high voltage spikes, that is spikes in the data which exceed five volts.

The operational amplifiers 40, 42, 44, 46, 48, 50, 52 and 54 used in the preferred embodiment are Model Number OPA2337 CMOS micro-amplifiers commercially available from Texas Instruments of Dallas, Tex. The conditioned analog signals are then supplied to microcontroller 24.

GPS digital data is monitored and buffered by a buffer amplifier 26 prior to being supplied to the UART input of microcontroller 20. The buffer amplifier 26 used in the preferred embodiment is a Model Number NC7SZ126 UHS Buffer with 3-state output commercially available from Fairchild Semiconductor Corporation of South Portland, Me.

Data is next supplied in burst from microcontroller 20 to programmable gate array 30 via an SPI (serial peripheral interface) bus. The programmable gate array 30 then regulates the flow of PCM data to a constant bit rate which is required for transmission of the PCM data to a receiving station for processing by the receiving station.

A sequence for analog data sampling and UART monitoring is described by a PCM frame format which is illustrated below. The PCM bit rate and frame format is established to meet the requirements of analog sampling rates and an RS-232 serial data bit rate. A minimum of four analog channels are sampled at a minimum of 10,000 samples per second, while supporting an RS-232 serial data bit rate of 230,400 bits per second.

Referring to FIGS. 1 and 3, to meet these sampling requirements, the clock oscillator 34 is set to a frequency of 25 MHz which is the maximum frequency usable by microcontroller 28. Setting the frequency of oscillator 34 to 25 MHz results in a bit rate of 1.25 megabits per second. Utilizing the PCM frame format set forth below results in a sampling rate of 10,416 samples per second for channels A0 through A3 (FIG. 3), and 2,083 samples per second for channels A4 through A7 (FIG. 3), while allowing for a bit rate of 230,400 bits per second of RS-232 serial data.

The PCM Frame Format for encoder 20 is:

S1S0D0A0D0A1D0A2D0A3D0A4D0A0D0A1D0A2D0A3 D0A5D0A0D0A1D0A2D0A3 D0A6D0A0D0A1D0A2 D0A3D0A7D0A0D0A1D0A2D0A3.

where S1 and S0 are the most and least significant 12-bit words of frame sync, D0 is one 12-bit word of UART data and status, and A0, A1, A2, A3, A4, A5, A6, and A7 are twelve bit words of analog data.

A PCM frame includes the following:
Frame Sync=24 bits=0xFAF320
S1=0xFAF

The two bytes containing 6-bits each, left justified, of S1 are:
MS 6 Bits=0xF8,
LS 6 Bits=0xBC
S0=0x320

The two bytes containing 6-bits each, left justified, of S0 are:
MS 6 Bits=0x30,
LS 6 Bits=0x80
A/D Conversions=12 bits UART Digital Data=8 bit data+4 bit status
  No Data Status=1000
  New Data Status=1100
  Frame Error Status=1001

Microprocessor 28 includes an internal analog to digital converter which converts data provided through operational amplifiers 40, 42, 44, 46, 48, 50, 52 and 54 to the A0-A7 inputs of microprocessor 28 to a digital format. The converter within microprocessor 28 runs in either an eight bit mode or a twelve bit mode, providing for excellent resolution of the converted analog data. Microprocessor 28 also has an internal UART which allows microprocessor 28 to receive RS-232 data supplied through buffer amplifier 26 to the RX input of microprocessor 28.

Figure 2A:
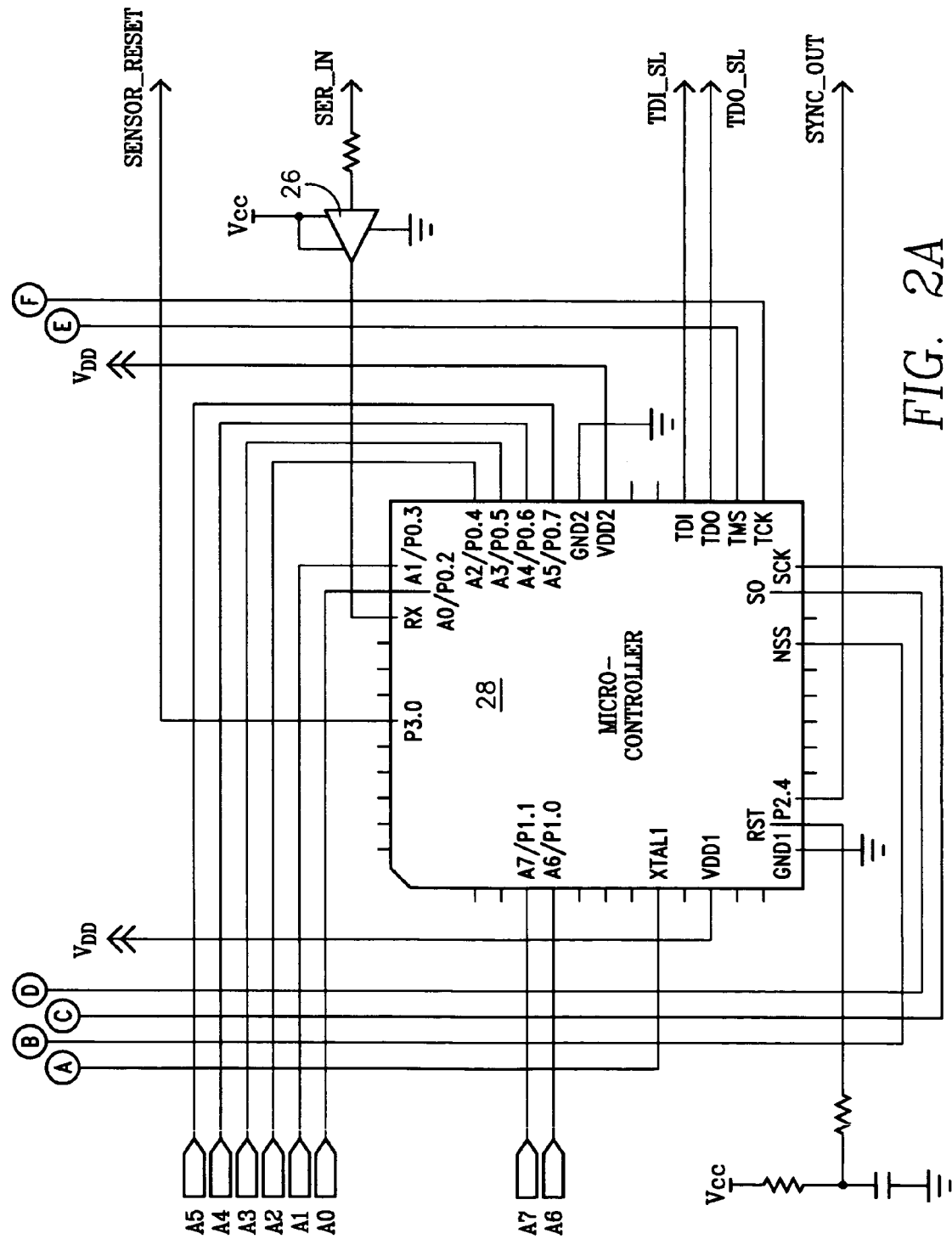
FIGS. 2A and 2B are a detailed electronic diagram of the miniaturized pulse code modulation encoder of FIG. 1.
Figure 2B:
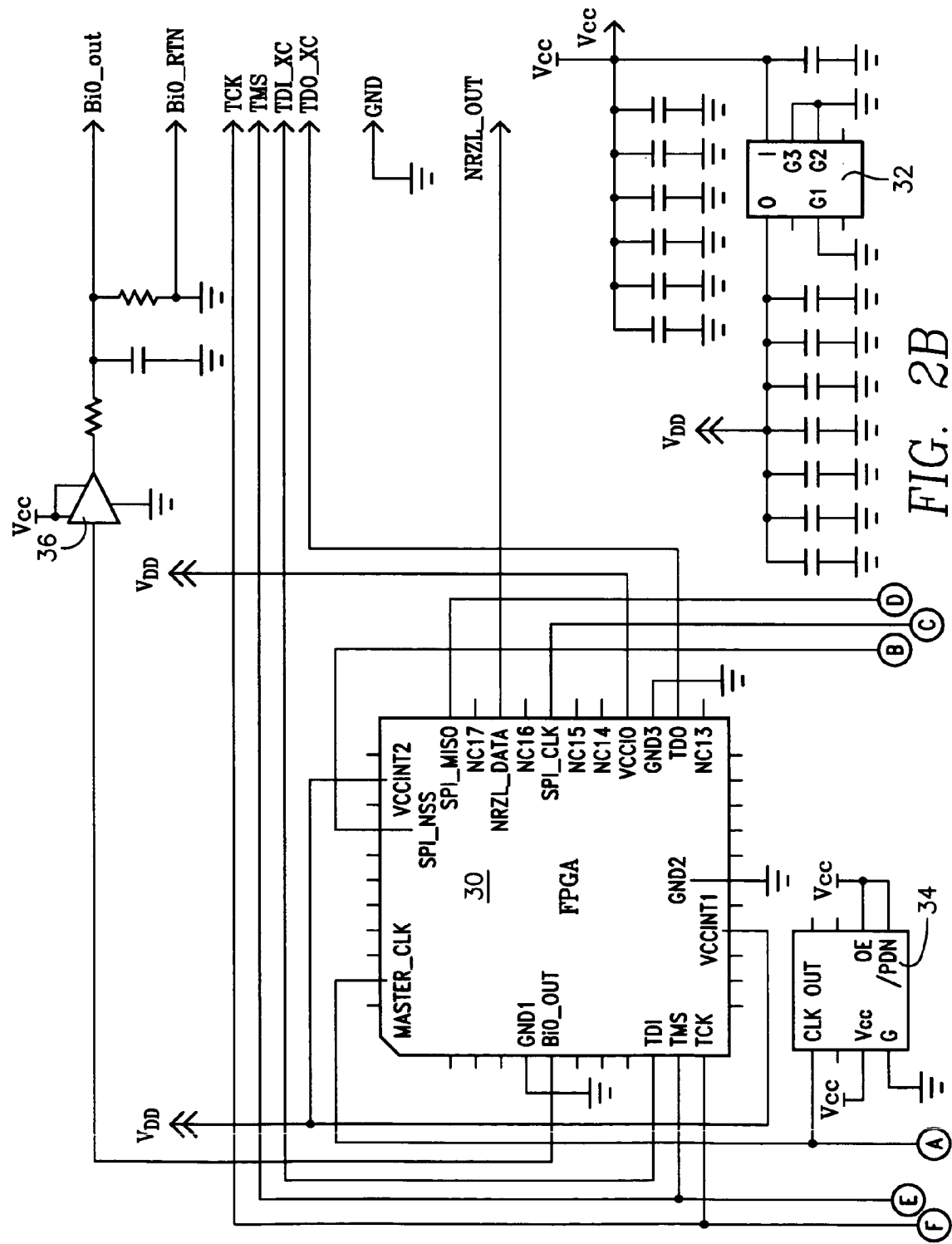

The microprocessor 28 operates within a voltage range of 0-5 volts with power for microprocessor 28 and gate array 30 being supplied by power regulator 32. The output from the power regulator is 3.3 volts. As shown FIGS. 2A and 2B, $V_{CC}$ is five volts and $V_{DD}$ is 3.3 volts.

Data from the microprocessor 28 is provided to the programmable gate array 30 as bursts of data. The programmable gate array 30 reclocks the data providing a signal which is compatible with the PCM transmitter 106.

The encoder 20 also has an output buffer amplifier 36 which buffers the PCM data stream supplied to PCM transmitter 106.

Figure 6A:

Referring to FIG. 6, FIG. 6A is the 25 MHz system clock signal for encoder 20. The 25 MHz clock signal of FIG. 6A is the clock signal for the microprocessor 28 and the gate array 30.

Figure 6B:
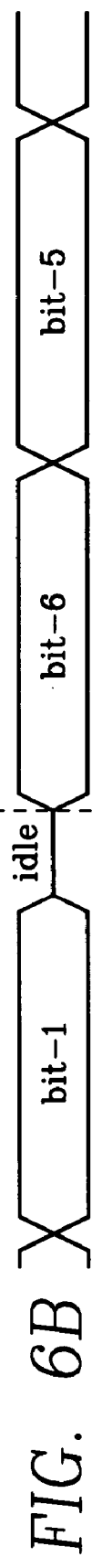
Figure 6C:
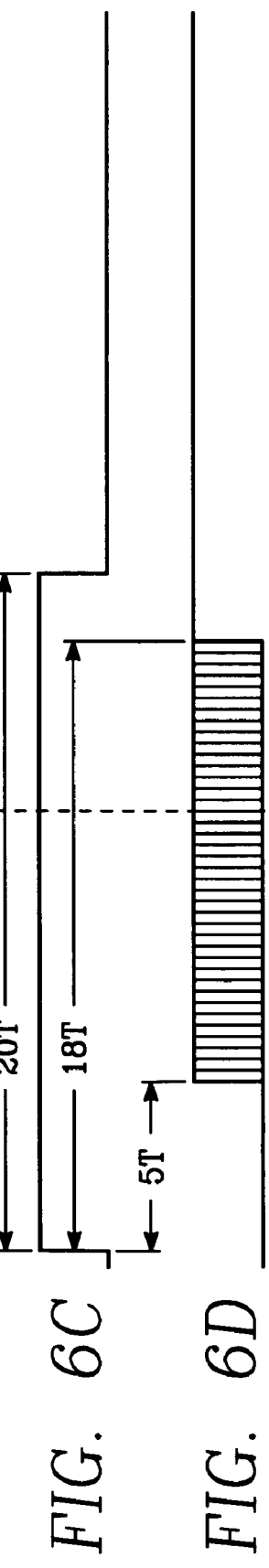
Figure 6D:

The encoder 20 is configured to process 12 bit PCM data words. The microprocessor 28 supplies data to the gate array 30 six bits at a time. The six bit output signal provided by microprocessor 28 to gate array 30 is depicted in FIG. 6B. FIG. 6C depicts an interrupt which is internal to microprocessor 28. The interrupt transitions to an active state when the last bit (bit-1) is to be transferred from the microprocessor 28 to the gate array 30. The next six bits of data are loaded into a parallel data holding register within microprocessor 28 for transfer to gate array 30. The data is shifted out of microprocessor 20 in a serial format. The interrupt remains high for a time period of twenty T which is twenty clock pulses of the clock signal of FIG. 1.

Figure 6E:
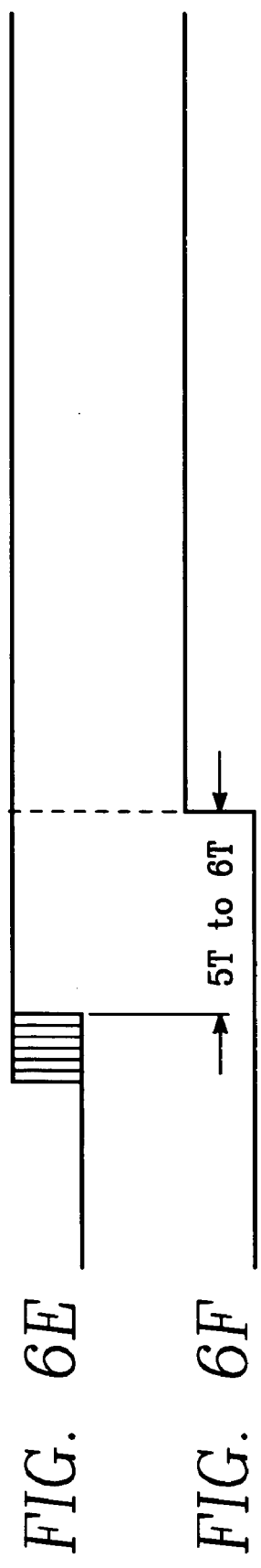
Figure 6F:
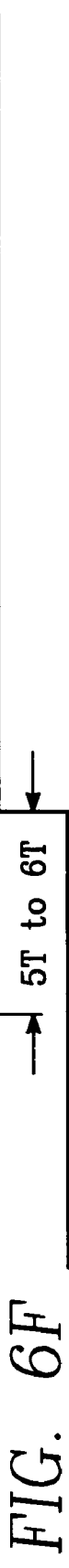

Five system clock pulses (FIG. 6D) are required for the microprocessor 20 to recognize the SPI Bus Interrupt. The computer software program then enters the SPI Bus Interrupt routine, illustrated in the flow chart of FIG. 13, after short time period approximately four clock cycles as shown in FIG. 6E. After the computer software is in the interrupt routine, loading the six bits of data into the holding register for transfer to gate array 30 takes five to six clock cycles as shown in FIG. 6F.

The interrupt flag of FIG. 6C is cleared within twenty clock cycles of the interrupt flag transitioning to an active state.

Referring to FIGS. 1 and 7, FIGS. 7A-7C depict timing diagrams for the transfer of eight bit and sixteen bit PCM data words and FIGS. 7D-7F depict timing diagrams for the transfer of twelve bit PCM data words. The SPI clock signals of FIGS. 7A and 7D. are provided by the gate array 30 to the microprocessor 28. The timing diagram for each 8 bit data transfer from microprocessor 28 to gate array 30 is depicted in FIG. 7B, while the timing diagram for each six bit data transfer from microprocessor 28 to gate array 30 is depicted in FIG. 7E. FIGS. 7C and 7F depict a control signal (SPI_NSS) from gate array 30 which indicates to microprocessor 28 that it is to shift out eight bits of data (FIG. 7C) or six bits of data (FIG. 7F). When the SPI_NSS signal of FIG. 7F transitions low twelve bits of data are transferred from microprocessor 28 to gate array 30 six bits at a time. The SPI clock signal of FIG. 7D provided by gate array 30 pulses six times to effect the transfer of the first six data bits and pulses an additional six times to effect the transfer of the second six data bits for each twelve bit PCM data word. The total time required to effect a six bit data transfer is 60 clock pulses of the clock signal of FIG. 6A. The time between data transfers is 5-6 clock pulses of the clock signal of FIG. 6A.

Figures 8, 9:
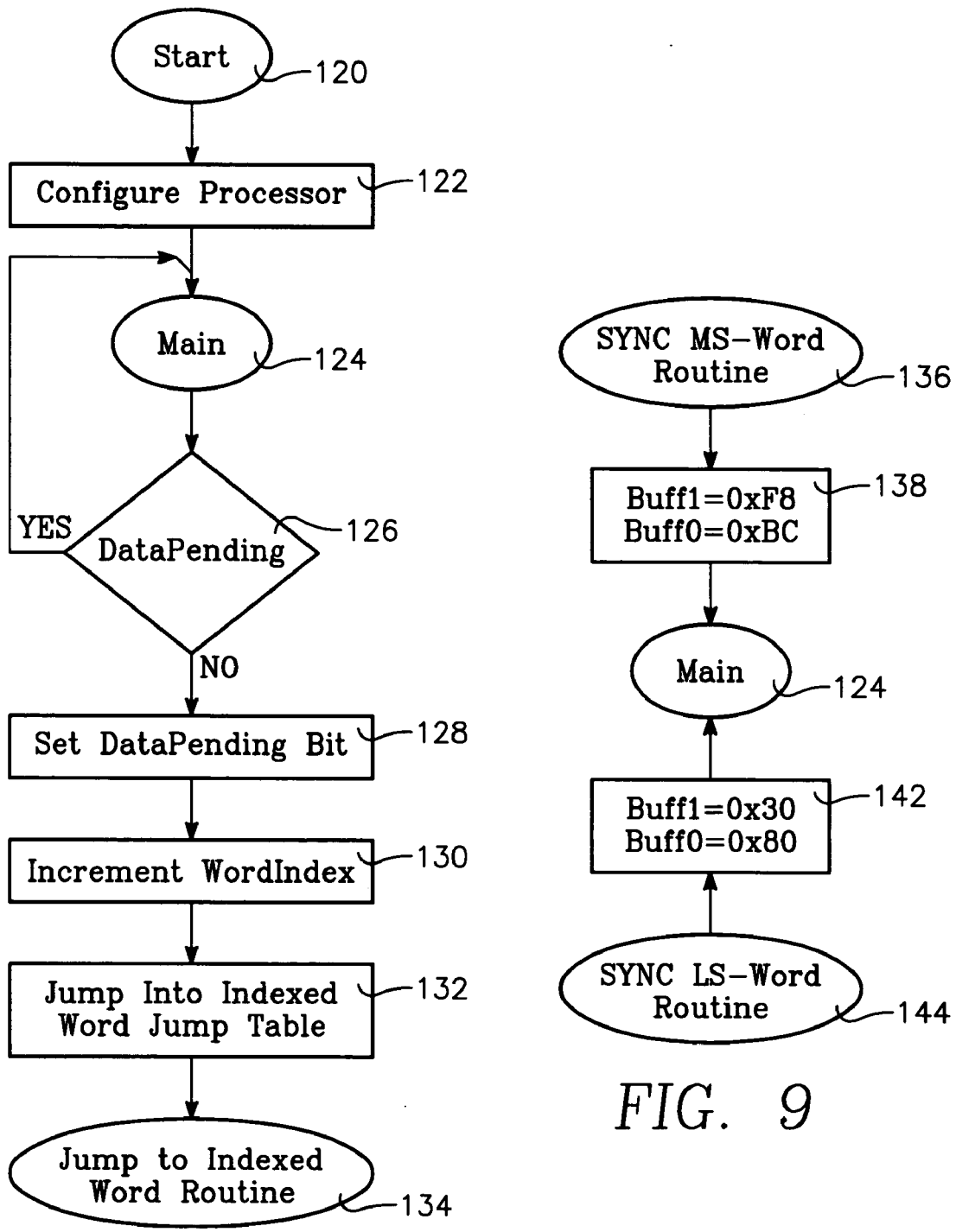
FIGS. 8-13 depict flow charts for the computer software program used in the microcontroller for the encoder of FIG. 1.

Referring to FIGS. 1 and 8, program step 122 configures microprocessor 28 and enables the UART within microprocessor 28. The software enters the main program (program step 124) and then tests a data pending flag (program step 126). The data pending flag is set in the main program and cleared in the SPI interrupt routine. When the holding register within microprocessor 28 is empty, the interrupt flag goes high which indicates that there are six bits of data to be loaded into the holding register. When the holding register is loaded with the six bits of data, the data pending flag is cleared (program step 210, FIG. 13) and the software returns to the main program of FIG. 8.

The software then exits the loop in the main program and proceeds from program step 126 to program step 128 which sets the data pending flag. Setting the data pending flag indicates to microprocessor 28 that new data has been loaded into the holding register. In addition, the next six bit word of data is flagged so that the six bits of data can be loaded into the holding register when the next interrupt occurs.

Program step 130 increments a word index. A jump into a word jump table occurs during program step 132. The index refers to the jump table which jumps to a portion of the software that processes data for the holding register prior to transfer to gate array 30 (program step 134). The data being processed is either frame sync data, UART data or analog data provided to microprocessor 28 via operational amplifiers 40, 42, 44, 46, 48, 50, 52 and 54.

At this time it should be noted that each of the eight channels of analog data is processed separately by the internal analog to digital converter, while software is selecting the channel A0-A7 or the UART data to be processed. Program step 130, 132 and 134 process the data received by microprocessor 28 at its A0-A7 inputs and its RX input. The jump table points to the routines for processing each channel of incoming analog data and UART data as well as the sync word routine. The sync word is a constant, that is the sync word remains the same for all PCM frames of data.

Referring to FIGS. 1 and 9, the sync word is 24 bits, processed twelve bits at a time consisting of 12 most significant bits and 12 least significant bits. The 6 most significant bits and the 6 least significant bits of each 12 bit half of the sync reside in buffers one and zero within microprocessor 28. For each six bits of the sync word the two least significant bits of the buffers are not utilized. Program step 138 place the 12 most significant bits. The first six bits of the sync word (0xF8, hexadecimal) are placed in buffer one, followed by the second six bits of the sync word (0xBC) which are placed into buffer zero. The binary equivalents are 11111000 and 10111100.

Program step 142 places the 12 least significant bits of the sync word into buffers one and zero with the first six bits (0x30, hexadecimal) being placed in buffer one, followed by the second six bits (0x80, hexadecimal) which are placed in buffer zero. The interrupt routine of FIG. 13 then transfers 12 bits of the 24 bit sync word from buffer one and buffer zero to the holding register within microprocessor 28, six bits at a time.

Figure 10:
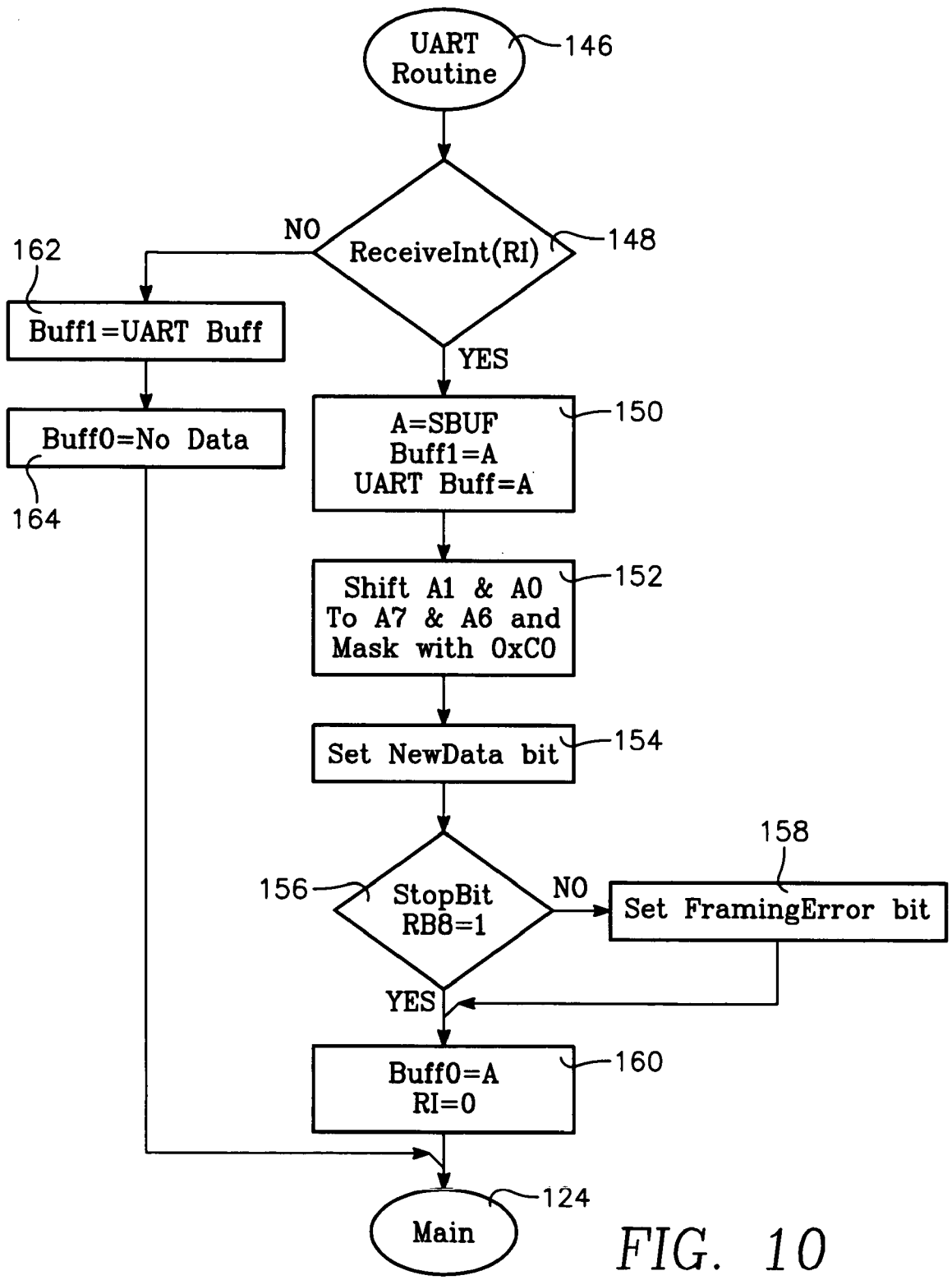

Referring to FIGS. 1 and 10, the UART routine (program step 146) processes the eight UART data words received by microprocessor 28 for transfer to gate array 30. The jump table in the software accesses the UART routine as well as the SYNC MS-Word routine (program step 136) and the SYNC LS-Word routine (program step 144). Program step 148 checks to determine if a receive interrupt flag is set. If the flag is set then the software proceeds to program step 150 where UART data from a serial buffer is transferred to an accumulator. The serial eight bit buffer within the microprocessor's internal UART receives eight bit UART data words from the external data source which is the GPS receiver 104. The UART data is then placed into buffer one and a UART buffer within microprocessor 28.

Program step 152 shifts to the two least significant bits of UART data from buffer one to buffer zero. The two least significant bits of UART data in buffer one when placed in buffer zero are the two most significant bits in buffer zero. Since data is transferred from the holding register within microprocessor 28 to gate array 30 six bits at time, the two least significant bits of each eight bit UART data word are saved in buffer zero of microprocessor 28 for a subsequent transfer from the holding register within microprocessor 28 to gate array 30. The remaining four bits in buffer zero are utilized as flags to insure accuracy of the UART data. The flags are as follows: no data received is 1000, new data received is 1100, and frame error has occurred is 1001.

Program step 156 tests a stop bit within the microprocessor's UART. When the stop is not high a framing error bit is set (program step 158) indicating a framing error. When the stop bit is high, the UART has received data without errors resulting in a new data status flag of 1100 in buffer zero for transfer to gate array 30.

When the receive interrupt is not set, program step 162 transfers old data and program step 164 transfers the flags which is no data, 1000.

Figure 4:
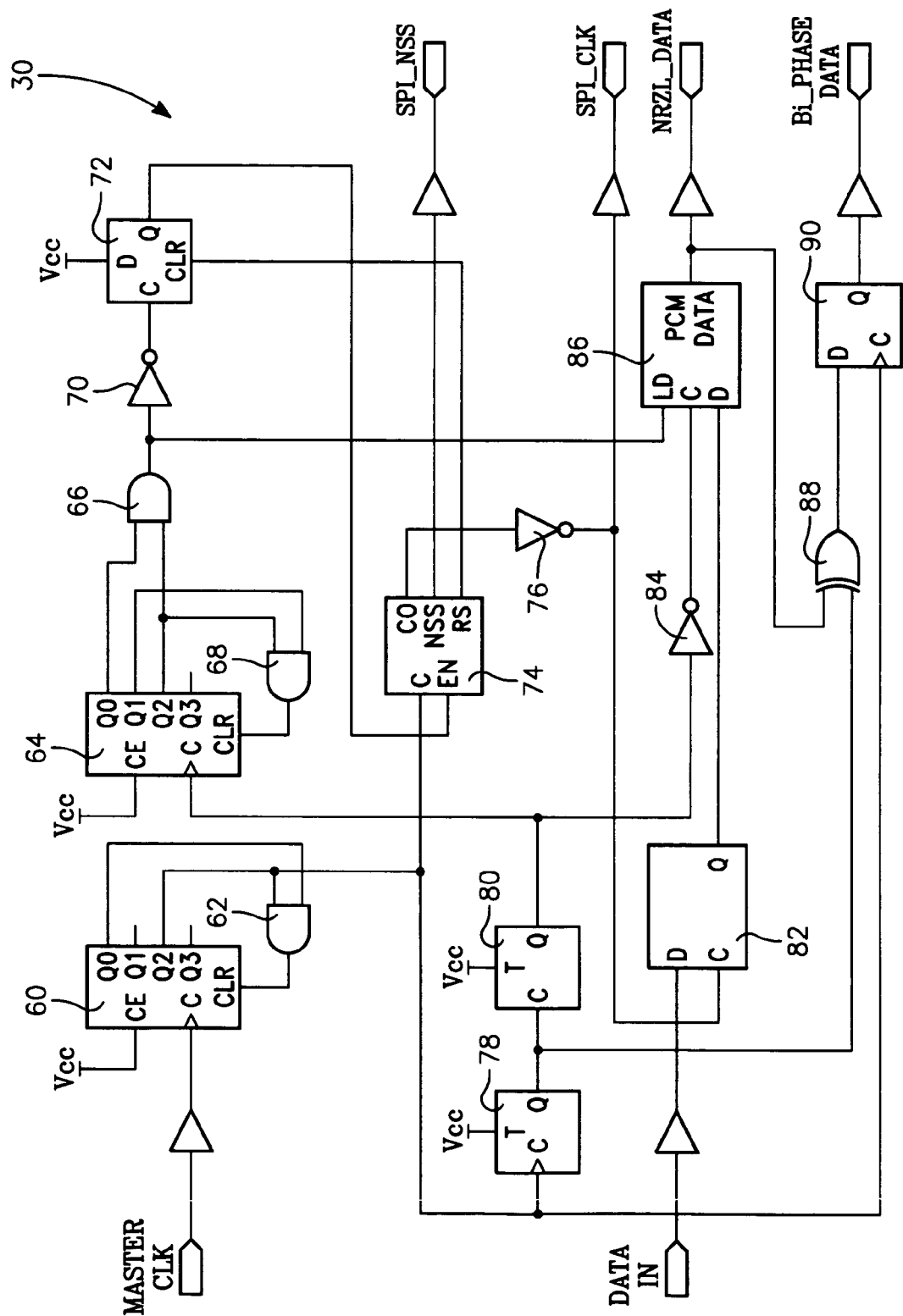
FIG. 4 illustrates a detailed electronic circuit diagram for the serial peripheral interface master circuit of the encoder of FIG. 1.
Figure 11:
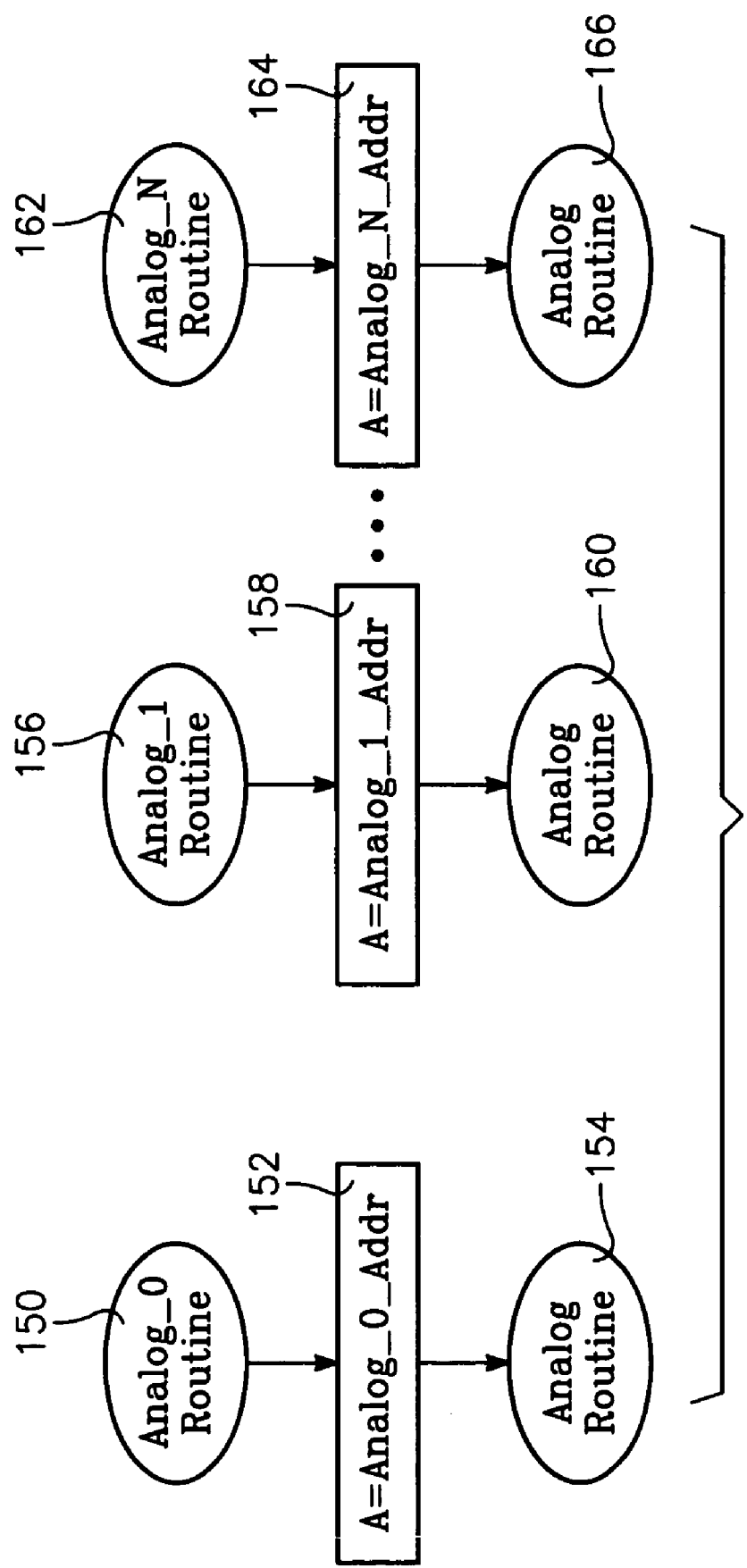

Referring to FIGS. 1, 4 and 11, the analog routine of FIG. 11 processes the analog data received by microprocessor 280 for transfer to gate array 30. The analog data first processed by the software is data from channel A0 (program step 150). The routine sets the address for analog channel A0 (program step 152) and places the address in the accumulator. The software then proceeds to the analog routine for processing analog data (program step 154). The same process is repeated for analog channel A1 (program steps 156, 158 and 160) and the remaining channels A2-A7 (program steps 166, 168 and 170). Program steps 154, 160 and 166 are the analog routine depicted in FIG. 12.

Figure 12:
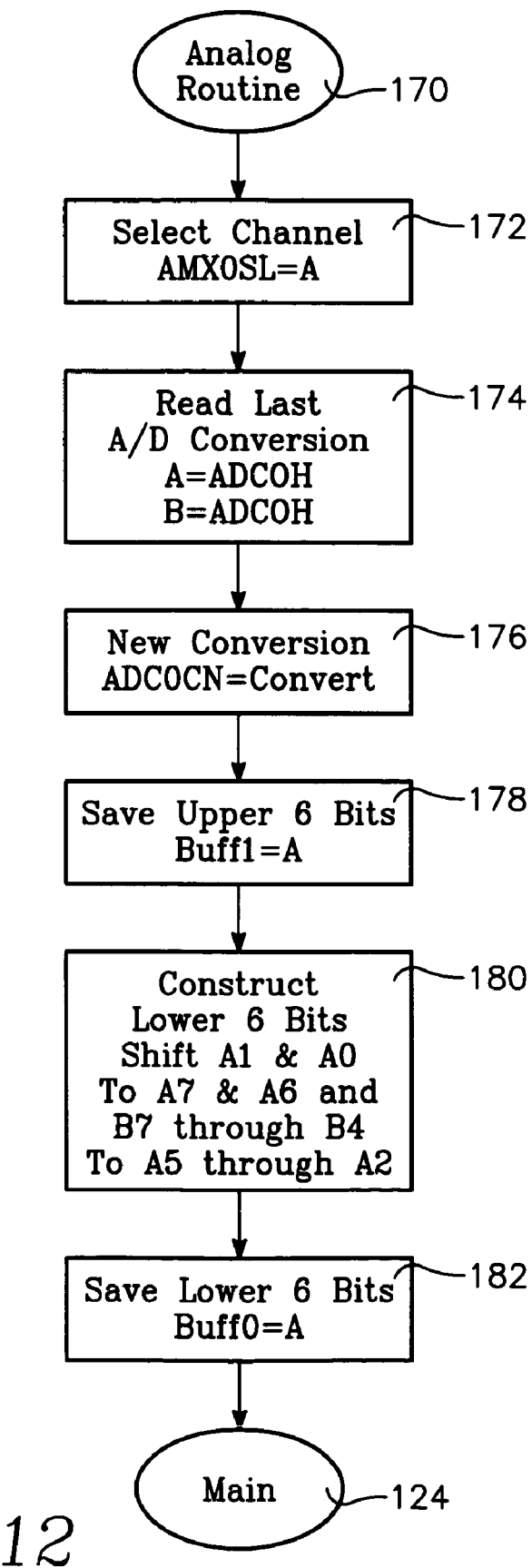

Referring to FIGS. 1, 4 and 12, program step 170 begins the analog routine. During program step 172, the address is transferred from the accumulator to the analog to digital address register AMX0SL. Program step 174 then reads the last A/D conversion which is located in registers ADC0H for the most significant bits and ADC0L for the least significant bits. Register ADC0H contains eight bits and ADC0L contains four bits of the twelve data bits converted.

Program step 176 starts a new conversion by setting a convert bit in a control register ADC0CN. The previous conversion's data is lost once a new conversion is initiated. Program step 178 saves the upper six bits in buffer one. The software after shifting the lower six bits, saves the lower six bits in buffer zero (program steps 180 and 182).

Figure 13:
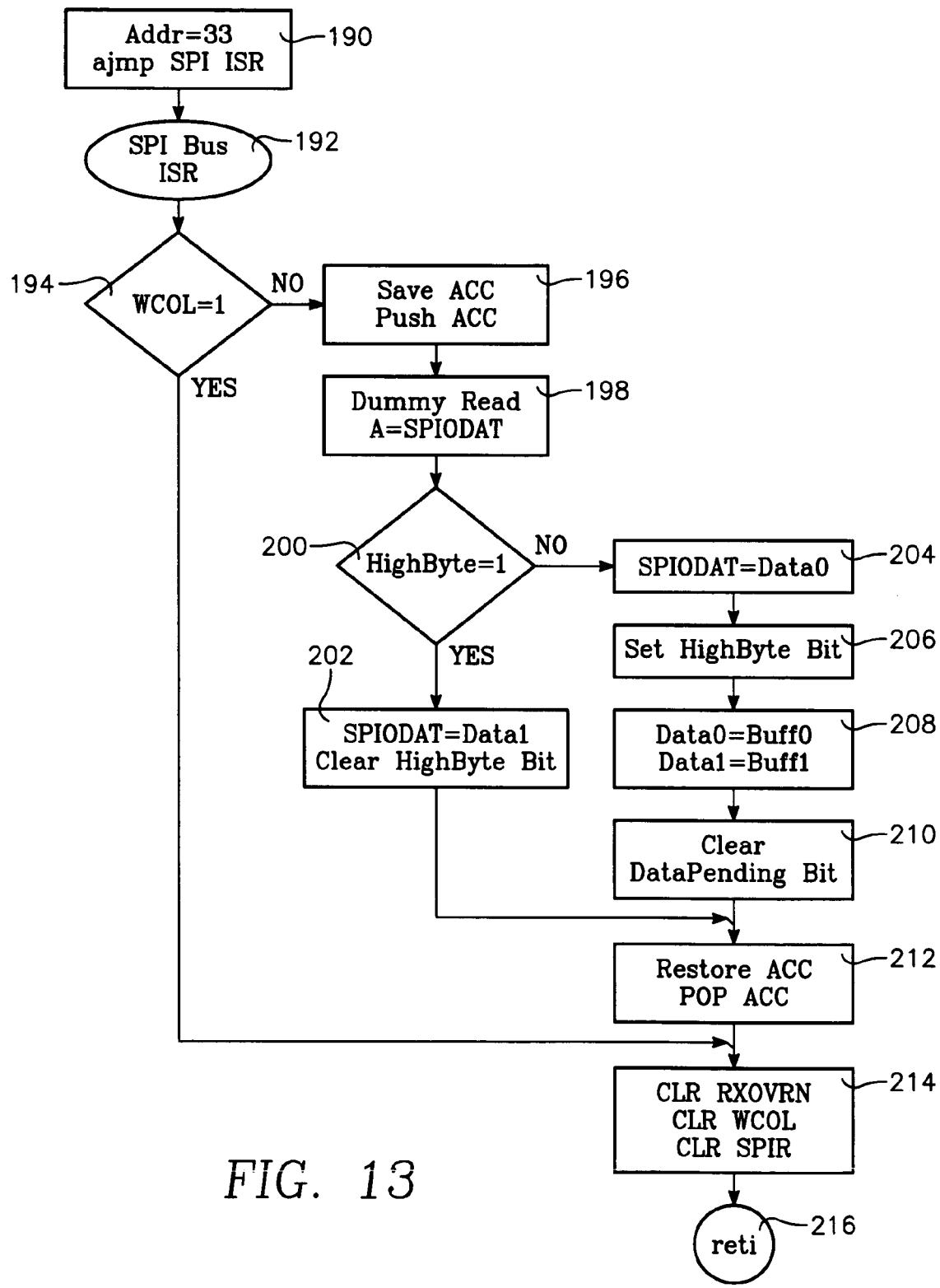

Referring to FIGS. 1 and 13, FIG. 13 depicts the SPI interrupt routine with interrupt being depicted in FIG. 6C. When the interrupt flag goes high, the software saves the program counter's location and then the software jumps to address thirty three which contains a jump vector to the location of the SPI interrupt bus service routine (program steps 190 and 192). When the flag WCOL is set software proceeds to program step 214. Normally, the flag of program step 194 is not set and the software proceeds to program step 196. The contents of the microprocessor's accumulator are saved (program step 196), and a dummy read of the SPI bus input register occurs (program step 198) to clear any erroneous data that may have been received.

Microprocessor 28 uses double buffered registers consisting of buffer zero and buffer one and data zero and data one. Data zero is a register holding the low six bits and data one is a register holding the high six bits.

Program step 200 determines if the high byte of data is currently being processed by the microprocessor. When the answer is YES, the high byte of data is loaded from the data one register into an SPIODAT register and the software for microprocessor 28 clears the high byte bit (program step 202). The SPIODAT register is a holding register for the SPI bus which shifts the data out of microprocessor 28 in to gate array 30.

Program step 212 restores the accumulator, while program step 214 clears the interrupt flag and returns to the program where the interrupt occurred (program step 216).

When the high byte bit is not set, then the software proceeds to program step 204. During program step 204, the low byte is loaded from the data zero register into the SPIODAT register. During program step 206, the high byte bit is set indicating that the high byte is the next byte to be processed. The data in buffer zero is transferred to data zero register and the data in buffer one is transferred to data one register during program step 208. Program step 210 clears the data pending bit.

Referring to FIG. 4, the gate array 30 includes the following elements:
4-Bit Counters 60 and 64
And gates 62, 66 and 68
D-Type Flip-Flops 72 and 90
Toggle Flip-Flops 78 and 80
Inverters 70, 76 and 84
EXCLUSIVE-OR gate 88
6-Bit Shift Registers 82 and 86
6-Bit Counter 74

The Bi Phase data provided at the Q output of Flip-Flop 90 includes the PCM data and the clock. The PCM bit rate for the Bi Phase Data is 2.5 Mbps (mega-bits per second). The output from the 6-Bit Shift Register 86 is raw PCM data, in a NRZL format, that is PCM data without the clock signal imbedded therein. An inverted SPI clock signal is provided at the CO output of 6-Bit Counter 74 and then inverted by inverter 76. The output of inverter 76 is the SPI_CLK signal of FIG. 7D for 12-bit PCM data words. The SPI_NSS signal of FIG. 7F is also provided by counter 74 at its NSS output.

For 8-bit/16-bit PCM data words, the SPI_CLK signal of FIG. 7A and the SPI_NSS signal of FIG. 7C are provided to microprocessor 28. FIG. 7C illustrates the resulting data sent from microprocessor 28 to gate array 30.

The timing signals required for the NRZL data and the Bi Phase data streams are generated by counters 60, 64 and 74 in combination with AND gates 62, 66 and 68, Inverters 70 and 76 and Flip-Flops 72, 78 and 80. The twelve bit PCM data words are supplied to the DATA IN input of gate array 30 shifted through shift registers 82 and 86 to the NRZL_DATA output of gate array 30. The data output of shift register 86 is supplied to the first input of EXCLUSIVE-OR gate 88, while the second input of EXCLUSIVE-OR gate 88 receives a timing signal from the output of FLIP-FLOP 78. The resultant signal which comprises data and the timing signal imbedded therein is supplied to the data input of Flip-Flop 90. The clock signal for Flip-Flop 90 is provided by counter 60. The PCM data output from Flip-Flop 90 has a unipolar Bi Phase format.

From the foregoing it is readily apparent, that the present invention comprises a new, unique and exceedingly useful miniaturized pulse code modulation encoder which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A PCM encoder for providing a PCM data stream, said PCM encoder being adapted for use on board a missile, said PCM encoder comprising:
    (a) eight operational amplifiers configured as voltage followers to provide for a high impedance interface and to eliminate high voltage spikes in data which exceeds five volts, each of said eight operation amplifiers receiving one channel of eight channels of analog sensor data from sensors on board said missile;
    (b) a buffer amplifier for receiving and buffering GPS UART data from a GPS receiver on board said missile;
    (c) a microcontroller connected to said eight operational amplifiers and said buffer amplifier, said microcontroller receiving said eight channels of analog data and converting each of said channels of analog sensor data to equivalent twelve bit sensor data words;
    (d) said microcontroller receiving said GPS UART data from said buffer amplifier, said microcontroller processing said GPS UART data to provide equivalent twelve bit GPS UART data words which include eight bits of GPS data and four bits of status data;
    (e) a programmed gate array connected to said microcontroller to receive a twenty four bit frame sync, said twelve bit sensor data words and said twelve bit GPS UART data words from said microcontroller;
    (f) said microcontroller providing said twenty four bit frame sync, said twelve bit sensor data words and said twelve bit GPS UART data words to said microcontroller in six bit increments of frame sync, six bit increments of sensor data and six bit increments of GPS UART data;
    (g) said programmed gate array formatting said six bit increments of frame sync, said six bit increments of sensor data and said six bit increments of GPS UART data into a PCM data stream which consist of NRZL (nonreturn-to-zero level) data and unipolar Bi Phase data.

2. The PCM encoder of claim 1 wherein said GPS UART data has an RS-232 format.

3. The PCM encoder of claim 1 wherein said four bits of status data comprises a no data status when a bit pattern for said status data is 1000, a new data status when said bit pattern for said status data is 1100 and a frame error status when said bit pattern for said status data is 1001.

4. The PCM encoder of claim 1 further comprising a power regulator connected said microcontroller, said programmed gate array, said eight operational amplifiers and said buffer amplifier, said power regulator providing output voltages of five volts and 3.3 volts to said microcontroller, said programmed gate array, said eight operational amplifiers and said buffer amplifier.

5. The PCM encoder of claim 1 further comprising a clock oscillator connected to said microcontroller, said clock oscillator providing a clock signal having a frequency of 25 MHz to said microcontroller.

6. The PCM encoder of claim 1 further comprising an output buffer amplifier connected to said microcontroller, said output buffer amplifier buffering said unipolar Bi Phase data of said PCM data stream prior to supplying said unipolar Bi Phase data of said PCM data stream to a PCM transmitter and antenna for transmission of said unipolar Bi Phase data of said PCM data stream to a ground station.

7. The PCM encoder of claim 1 wherein said programmed gate array comprises:
  (a) a first 4-Bit Counter having a clock input for receiving an external clock signal, a clear input and $Q_0$ and $Q_2$ outputs;
  (b) a first AND gate having a first input connected to the $Q_0$ output of said first 4-Bit Counter, a second input connected to the $Q_2$ output of said first 4-Bit Counter and an output connected to the clear input of said first 4-Bit Counter;
  (c) a second 4-Bit Counter having a clock input, a clear input and $Q_0$, $Q_1$ and $Q_2$ outputs;
  (d) a second AND gate having a first input connected to the $Q_1$ output of said second 4-Bit Counter, a second input connected to the $Q_2$ output of said second 4-Bit Counter and an output connected to the clear input of said second 4-Bit Counter;
  (e) a third AND gate having a first input connected to the $Q_0$ output of said second 4-Bit Counter, a second input connected to the $Q_2$ output of said second 4-Bit Counter and an output;
  (f) a first inverter having an input connected to the output of said third AND gate and an output;
  (g) a first flip-flop having a clock input connected to the output of said first inverter, a data input for receiving an external logic one signal, a clear input and a Q output;
  (h) a second flip-flop having a clock input connected to the $Q_2$ output of said first 4-Bit Counter, a toggle input for receiving said external logic one signal and a Q output;
  (i) a third flip-flop having a clock input connected to the Q output of said second flip-flop, a toggle input for receiving said external logic one signal and a Q output connected to the clock input of second 4-Bit Counter;
  (j) a second inverter having an input connected to the Q output of said third flip-flop and an output;
  (k) a 6-Bit Counter having a clock input connected to the Q2 output of said first 4-Bit Counter, an enable input connected to the Q output of said first flip-flop, a carry over output and a reset output connected to the clear input of said first flip-flop;
  (l) a third inverter having an input connected to the carry-over output of said 6-Bit Counter and an output;
  (k) a first 6-Bit Shift Register having a data input for receiving said six bit increments of frame sync, said six bit increments of sensor data and said six bit increments of GPS UART data from said microcontroller, a clock input connected to the output of said third inverter and a Q output;
  (l) a second 6-Bit Shift Register having a data input connected to the Q output of said 6-Bit Shift Register, a clock input connected to the output of said second inverter, a load input connected to the output of said third AND gate and a PCM data output for providing said NRZL data of said PCM data stream;
  (m) an EXCLUSIVE-OR gate having a first input connected to the PCM data output of said second 6-Bit Shift Register, a second input connected to the Q output of said second flip-flop and an output and an output; and
  (n) a fourth flip-flop having a data input connected to the output of said EXCLUSIVE-OR gate, a clock input connected to the Q2 output of said first six bit counter and an output for providing said unipolar Bi Phase data of said PCM data stream.

8. The PCM encoder of claim 1 wherein a PCM frame format for said PCM encoder is:
S1S0D0A0D0A0D0A1D0A2D0A3D0A4D0A0D0A1D0A2 D0A3D0A5D0A0D0A1D0A2D0A3 D0A6D0A0 D0A1 D0A2D0A3D0A7D0A0D0A1D0A2D0A3;
  where S1 and S0 are the most and least significant 12-bit words of said frame sync, D0 is one 12-bit word of said GPS UART data and said four bits of status data, and A0, A1, A2, A3, A4, AS, A6, and A7 are twelve bit words of analog data.

9. The PCM encoder of claim 8 wherein said twenty four bit frame sync has a hexadecimal equivalent of 0xFAF320 wherein S1 is equal to 0xFAF hexadecimal and S0 is equal to 0x320 hexadecimal.

10. A PCM encoder for providing a PCM data stream, said PCM encoder being adapted for use on board a missile, said PCM encoder comprising:
  (a) eight operational amplifiers configured as voltage followers to provide for a high impedance interface and to eliminate high voltage spikes in data which exceeds five volts, each of said eight operation amplifiers receiving one channel of eight channels of analog sensor data from sensors on board said missile;
  (b) a buffer amplifier for receiving and buffering GPS UART data from a GPS receiver on board said missile;
  (c) a microcontroller connected to said eight operational amplifiers and said buffer amplifier, said microcontroller receiving said eight channels of analog data and converting each of said eight channels of analog sensor data to equivalent twelve bit sensor data words;
  (d) said microcontroller including computer software controlling, handling and interperting a conversion of each of said eight channels of analog sensor data to said equivalent twelve bit sensor data words;
  (e) said microcontroller receiving said GPS UART data from said buffer amplifier, said microcontroller processing said GPS UART data to provide equivalent twelve bit GPS UART data words which include eight bits of GPS data and four bits of status data;
  (f) said computer software controlling, handling and interperting the processing of said GPS UART data to provide said equivalent twelve bit GPS UART data words;
  (g) a programmed gate array connected to said microcontroller to receive a twenty four bit frame sync, said twelve bit sensor data words and said twelve bit GPS UART data words from said microcontroller;
  (h) said computer software controlling and handling a transfer of said twenty four bit frame sync, said twelve bit sensor data words and said twelve bit GPS UART data words from said microcontroller to said programmed gate array;

(i) said computer software for said microcontroller providing said twenty four bit frame sync, said twelve bit sensor data words and said twelve bit GPS UART data words to said microcontroller in six bit increments of frame sync, six bit increments of sensor data and six bit increments of GPS UART data; and (j) said programmed gate array formatting said six bit increments of frame sync, said six bit increments of sensor data and said six bit increments of GPS UART data into a PCM data stream which consist of NRZL (nonreturn-to-zero level) data and unipolar Bi Phase data.

11. The PCM encoder of claim 10 wherein said GPS UART data has an RS-232 format.

12. The PCM encoder of claim 10 wherein said four bits of status data comprises a no data status when a bit pattern for said status data is 1000, a new data status when said bit pattern for said status data is 1100 and a frame error status when said bit pattern for said status data is 1001.

13. The PCM encoder of claim 10 further comprising a power regulator connected said microcontroller, said programmed gate array, said eight operational amplifiers and said buffer amplifier, said power regulator providing output voltages of five volts and 3.3 volts to said microcontroller, said programmed gate array, said eight operational amplifiers and said buffer amplifier.

14. The PCM encoder of claim 10 further comprising a clock oscillator connected to said microcontroller, said clock oscillator providing a clock signal having a frequency of 25 MHz to said microcontroller.

15. The PCM encoder of claim 10 further comprising an output buffer amplifier connected to said microcontroller, said output buffer amplifier buffering said unipolar Bi Phase data of said PCM data stream prior to supplying said unipolar Bi Phase data of said PCM data stream to a PCM transmitter and antenna for transmission of said unipolar Bi Phase data of said PCM data stream to a ground station.

16. The PCM encoder of claim 10 wherein said programmed gate array comprises:

(a) a first 4-Bit Counter having a clock input for receiving an external clock signal, a clear input and $Q_0$ and $Q_2$ outputs;

(b) a first AND gate having a first input connected to the $Q_0$ output of said first 4-Bit Counter, a second input connected to the $Q_2$ output of said first 4-Bit Counter and an output connected to the clear input of said first 4-Bit Counter;

(c) a second 4-Bit Counter having a clock input, a clear input and $Q_0$, $Q_1$ and $Q_2$ outputs;

(d) a second AND gate having a first input connected to the $Q_1$ output of said second 4-Bit Counter, a second input connected to the $Q_2$ output of said second 4-Bit Counter and an output connected to the clear input of said second 4-Bit Counter;

(e) a third AND gate having a first input connected to the $Q_0$ output of said second 4-Bit Counter, a second input connected to the $Q_2$ output of said second 4-Bit Counter and an output;

(f) a first inverter having an input connected to the output of said third AND gate and an output;

(g) a first flip-flop having a clock input connected to the output of said first inverter, a data input for receiving an external logic one signal, a clear input and a Q output;

(h) a second flip-flop having a clock input connected to the $Q_2$ output of said first 4-Bit Counter, a toggle input for receiving said external logic one signal and a Q output;

(i) a third flip-flop having a clock input connected to the Q output of said second flip-flop, a toggle input for receiving said external logic one signal and a Q output connected to the clock input of second 4-Bit Counter;

(j) a second inverter having an input connected to the Q output of said third flip-flop and an output;

(k) a 6-Bit Counter having a clock input connected to the Q2 output of said first 4-Bit Counter, an enable input connected to the Q output of said first flip-flop, a carry over output and a reset output connected to the clear input of said first flip-flop;

(l) a third inverter having an input connected to the carry-over output of said 6-Bit Counter and an output;

(k) a first 6-Bit Shift Register having a data input for receiving said six bit increments of frame sync, said six bit increments of sensor data and said six bit increments of GPS UART data from said microcontroller, a clock input connected to the output of said third inverter and a Q output;

(l) a second 6-Bit Shift Register having a data input connected to the Q output of said 6-Bit Shift Register, a clock input connected to the output of said second inverter, a load input connected to the output of said third AND gate and a PCM data output for providing said NRZL data of said PCM data stream;

(m) an EXCLUSIVE-OR gate having a first input connected to the PCM data output of said second 6-Bit Shift Register, a second input connected to the Q output of said second flip-flop and an output and an output; and (n) a fourth flip-flop having a data input connected to the output of said EXCLUSIVE-OR gate, a clock input connected to the Q2 output of said first six bit counter and an output for providing said unipolar Bi Phase data of said PCM data stream.

17. The PCM encoder of claim 10 wherein a PCM frame format for said PCM encoder is:

S1S0D0A0D0A1D0A2D0A3D0A4D0A0D0A1D0A2 D0A3D0A5D0A0D0A1D0A2D0A3 D0A6D0A0 D0A1D0A2D0A3D0A7D0A0D0A1D0A2D0A3;

where S1 and S0 are the most and least significant 12-bit words of said frame sync, D0 is one 12-bit word of said GPS UART data and said four bits of status data, and A0, A1, A2, A3, A4, A5, A6, and A7 are twelve bit words of analog data.

18. The PCM encoder of claim 17 wherein said twenty four bit frame sync has a hexadecimal equivalent of 0xFAF320 wherein S1 is equal to 0xFAF hexadecimal and S0 is equal to 0x320 hexadecimal.

19. A PCM encoder for providing a PCM data stream, said PCM encoder being adapted for use on board a missile, said PCM encoder comprising:

(a) eight operational amplifiers configured as voltage followers to provide for a high impedance interface and to eliminate high voltage spikes in data which exceeds five volts, each of said eight operation amplifiers receiving one channel of eight channels of analog sensor data from sensors on board said missile;

(b) a buffer amplifier for receiving and buffering GPS UART data from a GPS receiver on board said missile;

(c) a microcontroller connected to said eight operational amplifiers and said buffer amplifier, said microcontroller receiving said eight channels of analog data and converting each of said eight channels of analog sensor data to equivalent twelve bit sensor data words;

(d) said microcontroller including computer software controlling, handling and interpreting a conversion of each of said eight channels of analog sensor data to said equivalent twelve bit sensor data words;

(e) said microcontroller receiving said GPS UART data from said buffer amplifier, said microcontroller processing said GPS UART data to provide equivalent twelve bit GPS UART data words which include eight bits of GPS data and four bits of status data;

(f) said computer software controlling, handling and interperting the processing of said GPS UART data to provide said equivalent twelve bit GPS UART data words;

(g) a programmed gate array connected to said microcontroller to receive a twenty four bit frame sync, said twelve bit sensor data words and said twelve bit GPS UART data words from said microcontroller;

(h) said computer software controlling and handling a transfer of said twenty four bit frame sync, said twelve bit sensor data words and said twelve bit GPS UART data words from said microcontroller to said programmed gate array;

(i) said computer software for said microcontroller providing said twenty four bit frame sync, said twelve bit sensor data words and said twelve bit GPS UART data words to said microcontroller in six bit increments of frame sync, six bit increments of sensor data and six bit increments of GPS UART data;

(j) said programmed gate array formatting said six bit increments of frame sync, said six bit increments of sensor data and said six bit increments of GPS UART data into a PCM data stream which consist of NRZL (nonreturn-to-zero level) data and unipolar Bi Phase data;

(k) a power regulator connected said microcontroller, said programmed gate array, said eight operational amplifiers and said buffer amplifier, said power regulator providing output voltages of five volts and 3.3 volts to said microcontroller, said programmed gate array, said eight operational amplifiers and said buffer amplifier;

(l) a clock oscillator connected to said microcontroller, said clock oscillator providing a clock signal having a frequency of 25 MHz to said microcontroller; and (m) an output buffer amplifier connected to said microcontroller, said output buffer amplifier buffering said unipolar Bi Phase data of said PCM data stream prior to supplying said unipolar Bi Phase data of said PCM data stream to a PCM transmitter and antenna for transmission of said unipolar Bi Phase data of said PCM data stream to a ground station.

20. The PCM encoder of claim 19 wherein said programmed gate array comprises:

(a) a first 4-Bit Counter having a clock input for receiving an external clock signal, a clear input and $Q_0$ and $Q_2$ outputs;

(b) a first AND gate having a first input connected to the $Q_0$ output of said first 4-Bit Counter, a second input connected to the $Q_2$ output of said first 4-Bit Counter and an output connected to the clear input of said first 4-Bit Counter;

(c) a second 4-Bit Counter having a clock input, a clear input and $Q_0$, $Q_1$ and $Q_2$ outputs;

(d) a second AND gate having a first input connected to the $Q_1$ output of said second 4-Bit Counter, a second input connected to the $Q_2$ output of said second 4-Bit Counter and an output connected to the clear input of said second 4-Bit Counter;

(e) a third AND gate having a first input connected to the $Q_0$ output of said second 4-Bit Counter, a second input connected to the $Q_2$ output of said second 4-Bit Counter and an output;

(f) a first inverter having an input connected to the output of said third AND gate and an output;

(g) a first flip-flop having a clock input connected to the output of said first inverter, a data input for receiving an external logic one signal, a clear input and a Q output;

(h) a second flip-flop having a clock input connected to the $Q_2$ output of said first 4-Bit Counter, a toggle input for receiving said external logic one signal and a Q output;

(i) a third flip-flop having a clock input connected to the Q output of said second flip-flop, a toggle input for receiving said external logic one signal and a Q output connected to the clock input of second 4-Bit Counter;

(j) a second inverter having an input connected to the Q output of said third flip-flop and an output;

(k) a 6-Bit Counter having a clock input connected to the Q2 output of said first 4-Bit Counter, an enable input connected to the Q output of said first flip-flop, a carry over output and a reset output connected to the clear input of said first flip-flop;

(l) a third inverter having an input connected to the carry-over output of said 6-Bit Counter and an output;

(k) a first 6-Bit Shift Register having a data input for receiving said six bit increments of frame sync, said six bit increments of sensor data and said six bit increments of GPS UART data from said microcontroller, a clock input connected to the output of said third inverter and a Q output;

(l) a second 6-Bit Shift Register having a data input connected to the Q output of said 6-Bit Shift Register, a clock input connected to the output of said second inverter, a load input connected to the output of said third AND gate and a PCM data output for providing said NRZL data of said PCM data stream;

(m) an EXCLUSIVE-OR gate having a first input connected to the PCM data output of said second 6-Bit Shift Register, a second input connected to the Q output of said second flip-flop and an output and an output; and (n) a fourth flip-flop having a data input connected to the output of said EXCLUSIVE-OR gate, a clock input connected to the Q2 output of said first six bit counter and an output for providing said unipolar Bi Phase data of said PCM data stream.

* * * * *